(12) United States Patent
Shadi et al.

(10) Patent No.: US 9,350,623 B2
(45) Date of Patent: May 24, 2016

(54) SYSTEM AND METHOD FOR AUTOMATED DEPLOYMENT OF MULTI-COMPONENT COMPUTER ENVIRONMENT

(75) Inventors: Tomer Shadi, Yehud (IL); Dimitry Lifman, Yehud (IL); Nadav Fischer, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 217 days.

(21) Appl. No.: 13/818,109

(22) PCT Filed: Sep. 7, 2010

(86) PCT No.: PCT/US2010/048031
§ 371 (c)(1),
(2), (4) Date: Feb. 21, 2013

(87) PCT Pub. No.: WO2012/033485
PCT Pub. Date: Mar. 15, 2012

(65) Prior Publication Data
US 2013/0151975 A1    Jun. 13, 2013

(51) Int. Cl.
*H04L 12/24* (2006.01)
*G06F 9/445* (2006.01)

(52) U.S. Cl.
CPC *H04L 41/22* (2013.01); *G06F 8/60* (2013.01); *G06F 8/61* (2013.01)

(58) Field of Classification Search
CPC ........................................ H04L 41/22
USPC ........................................ 715/734
See application file for complete search history.

(56) References Cited

U.S. PATENT DOCUMENTS

| 7,340,520 | B1 | 3/2008 | Jordan et al. |
| 7,366,706 | B2 | 4/2008 | Chang et al. |
| 2003/0037327 | A1* | 2/2003 | Cicciarelli et al. ............ 717/178 |
| 2006/0004827 | A1* | 1/2006 | Stuart .......................... 707/102 |
| 2006/0080413 | A1 | 4/2006 | Oprea et al. |
| 2006/0112383 | A1 | 5/2006 | Chang et al. |
| 2006/0271581 | A1 | 11/2006 | Sanjar et al. |

(Continued)

FOREIGN PATENT DOCUMENTS

| CN | 101556533 A | 10/2009 |
| EP | 1577765 | 9/2005 |

(Continued)

OTHER PUBLICATIONS

Korean Intellectual Property Office, International Search Report, May 30, 2011, 3 pages, Daejeon, Republic of Korea.

*Primary Examiner* — Peiyong Weng
(74) *Attorney, Agent, or Firm* — Law Firm of Tim Myers

(57) ABSTRACT

A system and method are disclosed for automating the deployment of a multi-component computer environment. A user interface module (102) is configured to enable a user to design a desired topology of components in the multi-component computer environment. A deployment processing module (106) is configured to convert the desired topology to a set of deployment actions represented in a workflow script. An orchestration engine (114) is configured to use the set of deployment actions in the workflow script to execute an automated deployment of the multi-component computer environment on at least one deployment machine (118) to create the multi-component computer environment having the desired topology.

22 Claims, 11 Drawing Sheets

(56) References Cited

U.S. PATENT DOCUMENTS

| | | | |
|---|---|---|---|
| 2008/0040455 A1* | 2/2008 | MacLeod et al. | 709/220 |
| 2008/0098099 A1 | 4/2008 | Khasnis et al. | |
| 2008/0201707 A1* | 8/2008 | Lavery et al. | 717/178 |
| 2009/0300184 A1 | 12/2009 | Karve et al. | |
| 2009/0300619 A1 | 12/2009 | Hicks et al. | |
| 2010/0100767 A1 | 4/2010 | Liu et al. | |
| 2010/0313185 A1* | 12/2010 | Gupta et al. | 717/124 |

FOREIGN PATENT DOCUMENTS

| | | |
|---|---|---|
| EP | 1114368 B2 | 1/2006 |
| WO | WO-2007011942 A1 | 1/2007 |
| WO | WO-2008127321 A2 | 10/2008 |

* cited by examiner

Topology Validation

| Entity | Validations | |
|---|---|---|
| | Validation | Description |
| Product | Deployment Machine | Verifies that a deployment machine is defined for the product. |
| Virtual Machine | Host Definition | Verifies that the virtual machine has a host name or IP defined. |
| | Resource Pool | Verifies that the resource pool property is defined and that it exists in the target deployment machine. |
| | Datastore | Verifies that the datastore property is defined, that it exists in the target deployment machine and is visible to the selected resource pool. |
| | Virtual Network | Verifies that the virtual network property is defined, that it exists in the target deployment machine and is visible to the selected resource pool. |
| | VM Folder | Verifies that the VM folder property is defined, that it exists in the target deployment machine and that it exists in the datacenter that owns the selected resource pool. |
| | OS Activation Key | Verifies that the OS activation key is defined, if required. |
| Deployment Machine | Host Definition | Verifies that the user has specified a host name or internet protocol address. |
| | Credentials | Verifies that the login credentials are valid by establishing a connection to the deployment machine using the credentials. |

FIG. 3a

Topology Validation

| Entity | Validations | |
|---|---|---|
| | Validation | Description |
| Deployment Machine | Host Definition | Verifies that the user has specified a host name or internet protocol address. |
| | | |
| | Credentials | Verifies that the login credentials are valid by establishing a connection to the deployment machine using the credentials. |
| | Resource Pool Memory | Verifies that the total sum of memory of all of the virtual machines assigned to a resource pool does not exceed the actual available memory reservation on the resource pool.<br><br>The actual available memory reservation for every resource pool is directly ascertained from the deployment machines runtime memory information of the resource pool. |
| | Datastore Diskspace | Verifies that the total sum of diskspace of all of the virtual machines assigned to a datastore does not exceed the actual available diskspace on the datastore. |

FIG. 3b

Property Categories

| Category | Description |
|---|---|
| Product Details | Details the properties that define the products state and behavior. |
| Virtual Machine Details | Details the properties that define the virtual machine system configuration and login credentials. |
| Integration Details | Details the properties that define the integration state and behavior. |
| Machine Details | Details the properties that define the machine system configuration and login credentials. |
| Solution Details | Details the properties that provide additional solution information. |
| Deployment Details | Details the properties that define the deployment state. |

FIG. 3c

SYSTEM AND METHOD FOR AUTOMATED DEPLOYMENT OF MULTI-COMPONENT COMPUTER ENVIRONMENT

BACKGROUND

The deployment of a multi-component computer system is a labor intensive process that includes many steps. The deployment and integration of the multi-component computer system is often performed manually by a number of skilled engineers, each with a specific component expertise of the overall system. The engineers often travel to the deployment site and can spend from several hours to several days deploying and integrating the multi-component system. The complexity of connecting a wide variety of hardware and software components can be daunting. The components can include storage servers, memory servers, proxy servers, database servers, portal servers, applications running on the servers, as well as additional types of hardware and software operating on the multi-component computer system.

The complexity of installing a multi-component system can be even greater when the system is installed onto a pre-existing system. The labor costs associated with the large number of hours or days to install and debug a multi-component computer system can significantly increase the cost of the overall system. The increased costs can reduce demand for the system and decrease the number of customers willing to pay for such a system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 3a and 3b illustrate a Topology Validation table providing examples of selected validation actions that can be executed;

FIG. 3c illustrates a Property Categories table providing a list of common property categories;

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

Information technology (IT) environments have become increasingly complex. The need to update and maintain an IT environment often entails significant upkeep with subsequent downtime. In accordance with one embodiment of the present technology, full system pre-deployment validation can be achieved, thereby providing the user with a more transparent and precise system of checks and balances. A user can affect automated changes across the devices in the IT environment and connect new machines with a single action and integrate workflow topology.

Figure 1A:
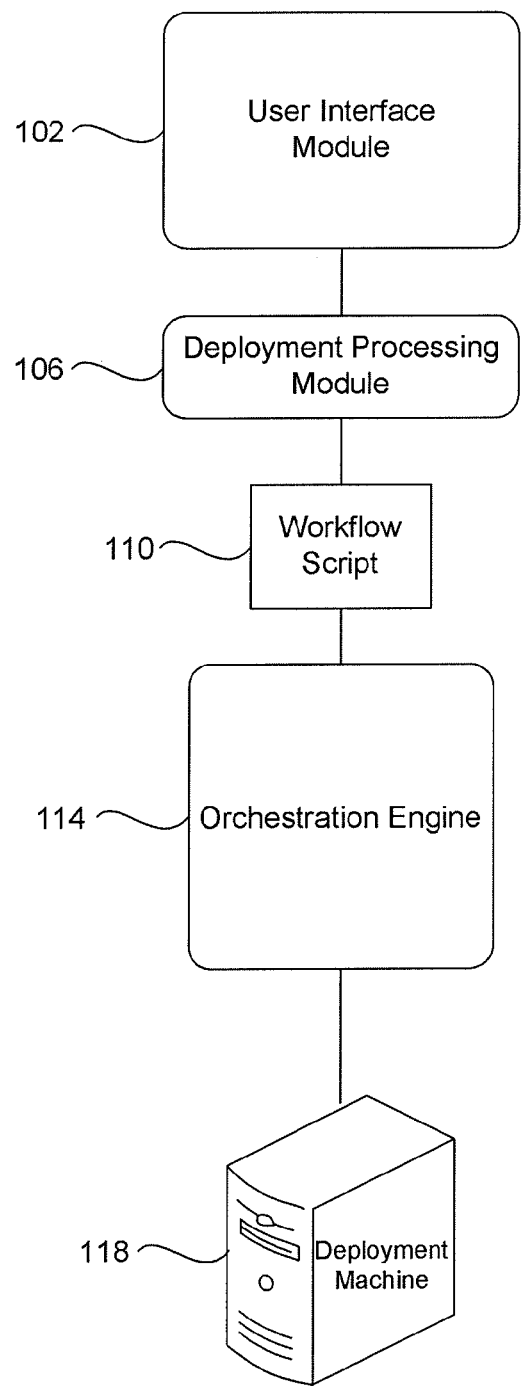
FIG. 1a is an illustration of an example embodiment of a system for automated deployment of a multi-component computer environment.

FIG. 1a provides an illustration of one example embodiment of a system for automated deployment of a multi-component computer environment. The system comprises a user interface module 102 configured to enable a user to design a desired topology of components in the multi-component computer environment. Components can be software products and the integrations used to configure and install the software products on and connect the software products to physical machines such as servers and virtual machines running on servers.

The system illustrated in FIG. 1a further comprises a deployment processing module 106 configured to convert the desired topology to a set of deployment actions represented by a workflow script 110. The system uses an orchestration engine 114 that is configured to use the set of deployment actions in the workflow script to execute an automated deployment of the multi-component computer environment. In the example embodiment illustrated in FIG. 1a the automated deployment is accomplished using at least one deployment machine 118.

An open architecture can be utilized to define components used in the design of deployment topologies. A user can create entity definitions for each component. An entity definition contains the definitions of components used in the construction of topologies. The entity definitions can include a product definition, integration definition(s), virtual machine definition(s), and physical machine definition(s). The entity definitions may be created in files such as XML files or other types of files or databases that contain the metadata required for building the deployment topologies.

For instance, when a selected software product is to be installed on a target machine the actual executable for starting and stopping the product is a file that can be copied to the target machine. The entity definitions can include metadata that indicates that, in order for the product to be started and stopped, the executable should first be copied to the target machine and then run.

Figure 1B:
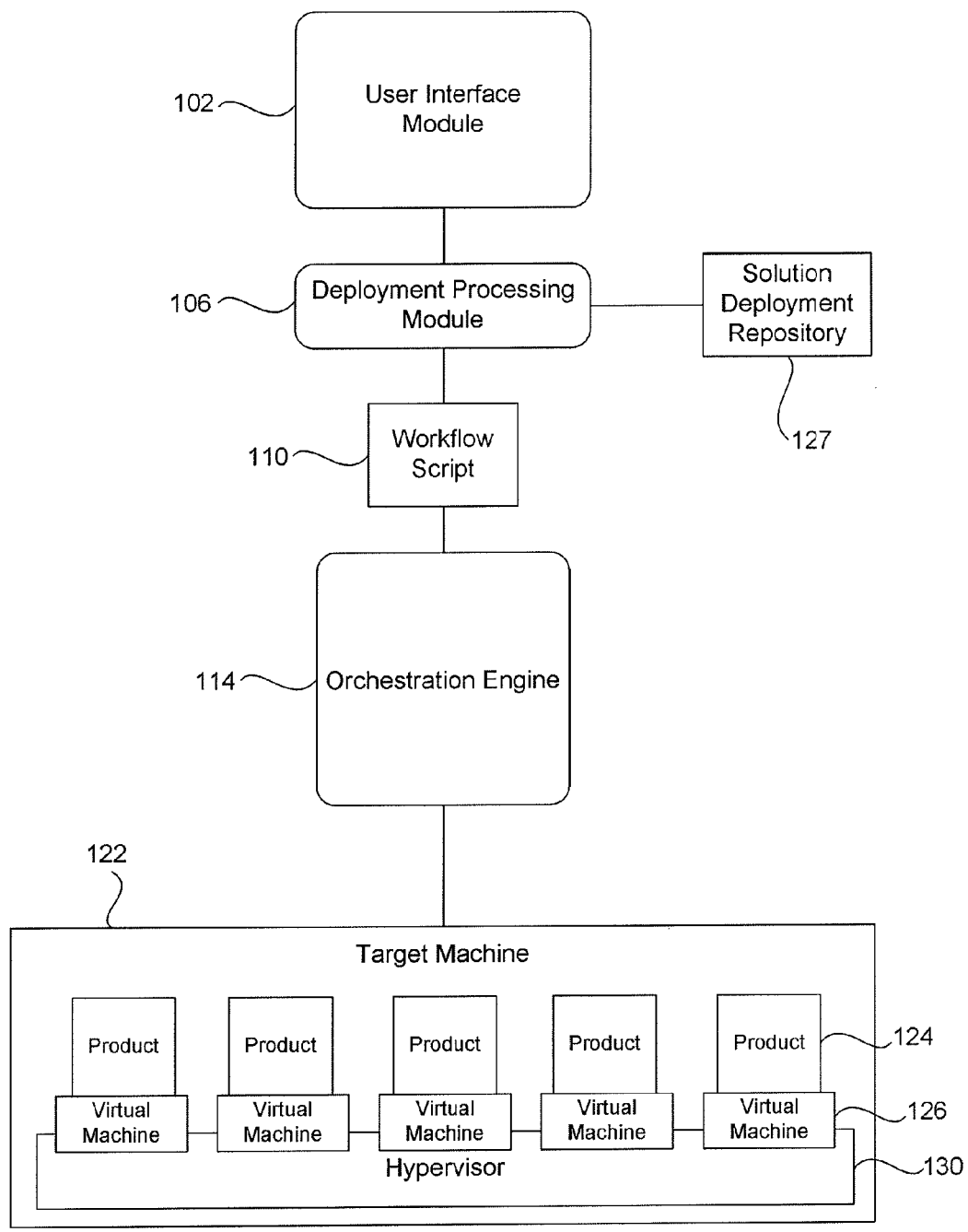
FIG. 1b is an illustration of an example embodiment of a system for automated deployment of a multi-component computer environment using a virtual machine.

In another embodiment illustrated in FIG. 1b, the multi-component computer environment is automatically deployed as separate products 124 that can operate on virtual machines 126. Each product can operate on a separate virtual machine. Alternatively, multiple products may operate on a single virtual machine. Each virtual machine can operate on a hypervisor 130 operating on a deployment machine 122. A hypervisor allows multiple virtual machines to run concurrently on a host computer. The hypervisor provides the guest operating systems with a virtual platform and monitors the execution of the guest operating systems. The hypervisor can be a VMware hypervisor, such as the ESX/ESXi, or another type of hypervisor.

Each virtual machine may operate using a different set of requirements, such as operating system, memory, disk space, and so forth. The number of virtual machines that can operate on the deployment machine is determined so that the virtual machines total sum of resource requirements does not exceed the available resources of the deployment machine. Multiple deployment machines 122 may be used to host the products 124 operating on the virtual machines 126.

The deployment processing module 106 can be in communication with a repository referred to as a solution deployment repository (SDR) 127. The SDR contains sets of design and runtime executable files used to design deployment topologies, execute the deployment process, and to manage the deployed environment. The runtime executable files include virtual machines, configuration files, and validation files. The runtime executable can be configured to be deployed by the orchestration engine 114 as a virtual appliance. The deployment processing module can access files in the solution deployment repository. The entity definition files can also reside in the solution deployment repository.

Figure 1C:
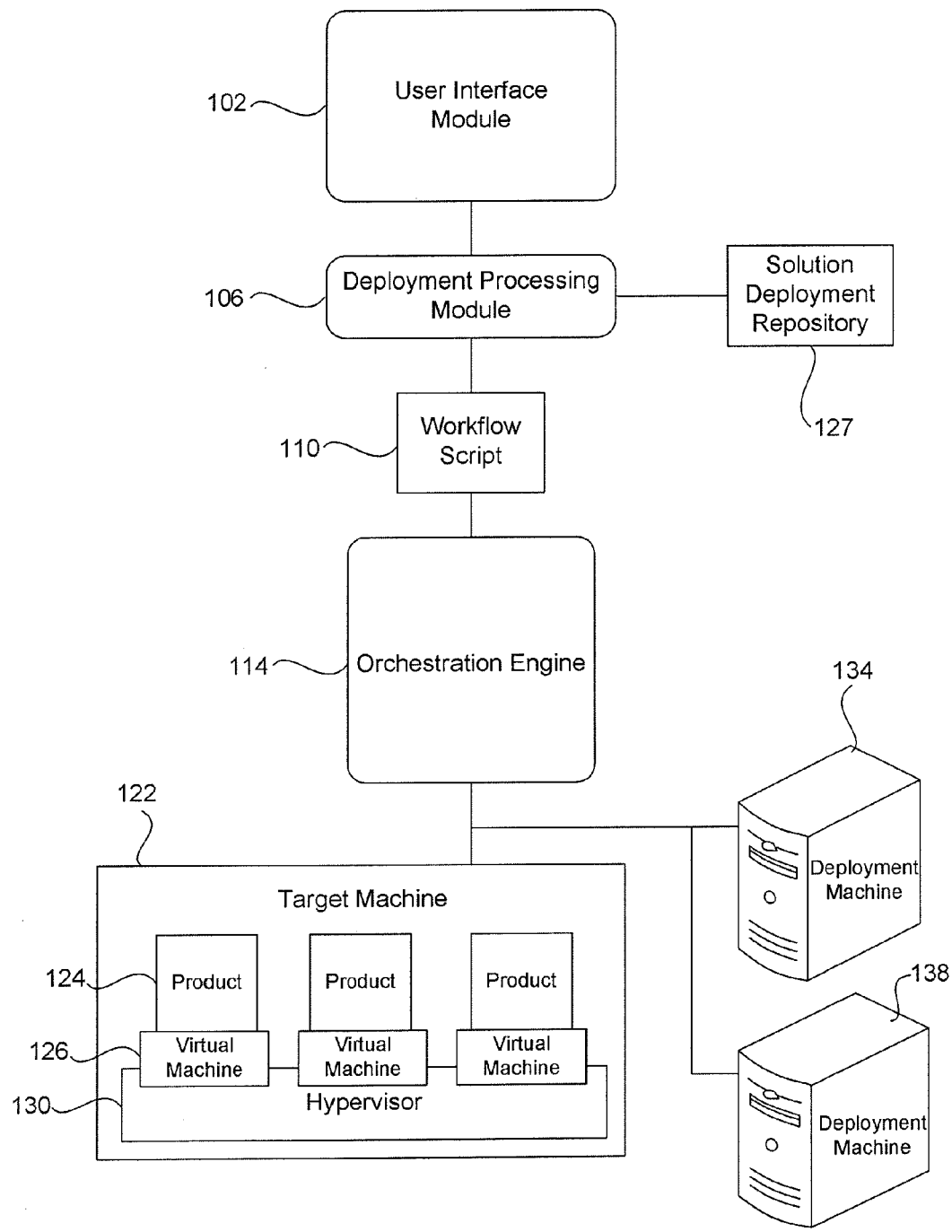
FIG. 1c is an illustration of an example embodiment of a system for automated deployment of a multi-component computer environment using a virtual machine and a physical machine.

In another embodiment illustrated in FIG. 1c, a user can configure the components of the multi-component computer environment to be automatically deployed onto multiple target machines 122, 134, and 138. A target machine is a deployment machine to which a selected component in the multi-component environment has been assigned or targeted for installation and/or operation. The user can select which products 124 are connected to which machines using the user interface module 102. A determination can also be made about whether or not the product is deployed on a virtual machine 126 or a physical machine 134, 138. The entity definitions and files for each component can be stored in the solution deployment repository 127. In this example embodiment, the target machines 134 and 138 may each host a single product, while target machine 122 can host multiple products 124, with each product operating on a virtual machine 126. The actual distribution of the products is based on the available resources and the products' needs and requirements.

Figure 2A:
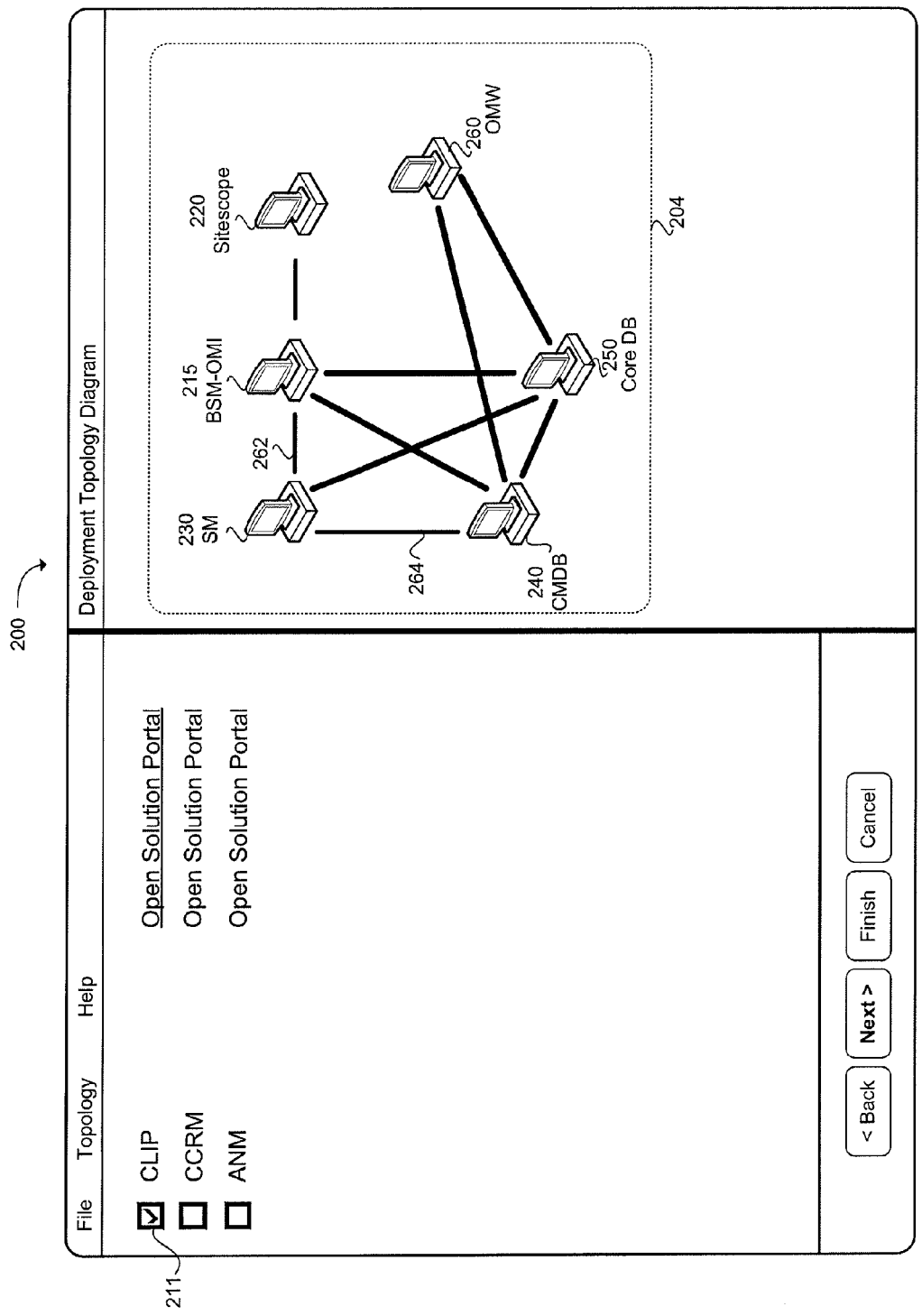
FIG. 2a is an example embodiment of a user interface configured to enable the user to design a desired deployment topology of the multi-component computer environment.

In one embodiment, the user interface module 102 can provide a graphical interface for a user to design a desired deployment topology. For example, FIG. 2a provides an example of a user interface configured to enable the user to design a desired deployment topology. A deployment topology is a graphical representation of the system components that comprise the deployment scheme. The deployment topology includes the deployed products (i.e. software applications), deployment machines, and the connections between them, represented as graphic nodes, integration connectors and deployment connectors. Each node and connector can be configured by applying values to a predefined set of properties associated with each element. The properties can be revealed by selecting the appropriate element in the user interface window.

In the example of FIG. 2a, a plurality of products are illustrated as product entities 220-260. Each product represents a separate application or group of applications. Different icons may be used to represent applications that will be deployed on a physical machine and those that will be deployed on a virtual machine.

Each product entity icon 215-260 represents a deployable product entity. The deployable product is typically one or more software applications. In addition, the deployable product entity can also include firmware and/or hardware products such as an authentication server or firewall. The deployable product entity provides the user with the ability to configure the product prior to deployment and manage application functionality once deployed. The product entity can be configured such that the product can be deployed as an executable operating on a selected operating system on a desired physical deployment machine, such as a deployment server. Alternatively, the product can be designed to be deployed to operate on a virtual machine. A product that is to be deployed to operate on a virtual machine is referred to herein as a virtual appliance. For example, once a virtual machine includes all of the needed components to use a product such as a configuration management database (CMDB), the combination of the virtual machine and components are regarded as the virtual appliance of CMDB.

An integration entity icon 262 displayed in the user interface 200 represents a deployable integration between two products. In this case, the integration entity icon represents an integration of the Service Manager (SM) product and the Business Service Management—Operation Manager Integration (BSM-OMI) product, which essentially provides an integration of the SM and the BSM. The integration entity icon 262 provides selected information for setting up the integration between the integration endpoints of each product entity icon 215-260. The integration entity information can be stored in the solution deployment repository 127 (FIG. 1b, 1c) in a readable format such as XML, HTML, or another type of readable storage format, as can be appreciated.

The deployment topology can be constructed by identifying the information needed to integrate two separate products. The user interface enables the user to define a set of system requirements for deployable entities. In one embodiment, the entity definition can include the system requirements. The system requirements include memory constrains, disk space constrains and supported operating system. These requirements can be used as constrains during the design phase of the deployment topology in order to ensure a stable and consistent deployment.

In addition the user interface may provide a wizard that can guide the user in constructing a deployment topology for desired products using previously entered data or configurations. A solution entity represents a group of products and integrations delivered as a single package. The solution entity specifies the identification (ID) of each of the products and integrations that comprise the solution.

For example, FIG. 2a shows an example of a solution entity for the Closed Loop Incident Process (CLIP) version 9.0 deployment topology. When the box 211 is checked then the graphical representation 204 of the solution entity for CLIP 9.0 is shown. The user may also select one of the Change Configuration and Release Management (CCRM) or Automated Network Management (ANM) deployment topologies to display the graphical representation of the solution entity for these topologies. Any number of solution entities may be displayed.

When the CLIP solution entity is selected by checking the box then the topology information for the CLIP 9.0 deployment topology that was previously entered and saved can be displayed. The solution entity shows the identification of each product and the integrations that comprise the solution. For instance, the CLIP 9.0 solution includes a BSM-OMI product 215, a service manager product 230, a Sitescope product 220, a Configuration Management Database (CMDB) application 240, a core database 250, and an Operation Manger Windows (OMW) product 260. The integration between the various products is represented by the dark lines, such as 264.

The user interface wizard can include a product selection screen. The product selection screen may enable the user to select the products that the user desires to deploy and may allow the user to specify each product's deployment location. For instance, FIG. 2b shows an example of a product selection screen 209 that displays which products are selected for deployment, as well as the machine 205, 210 to which each product can be deployed.

A deployment machine entity icon 205, 210 can represent a machine that hosts deployable product entities. Several deployable product entities can be assigned to the same machine as long as their total sum of resource requirements do not exceed the available resources of that machine, as previously discussed.

Figure 2B:
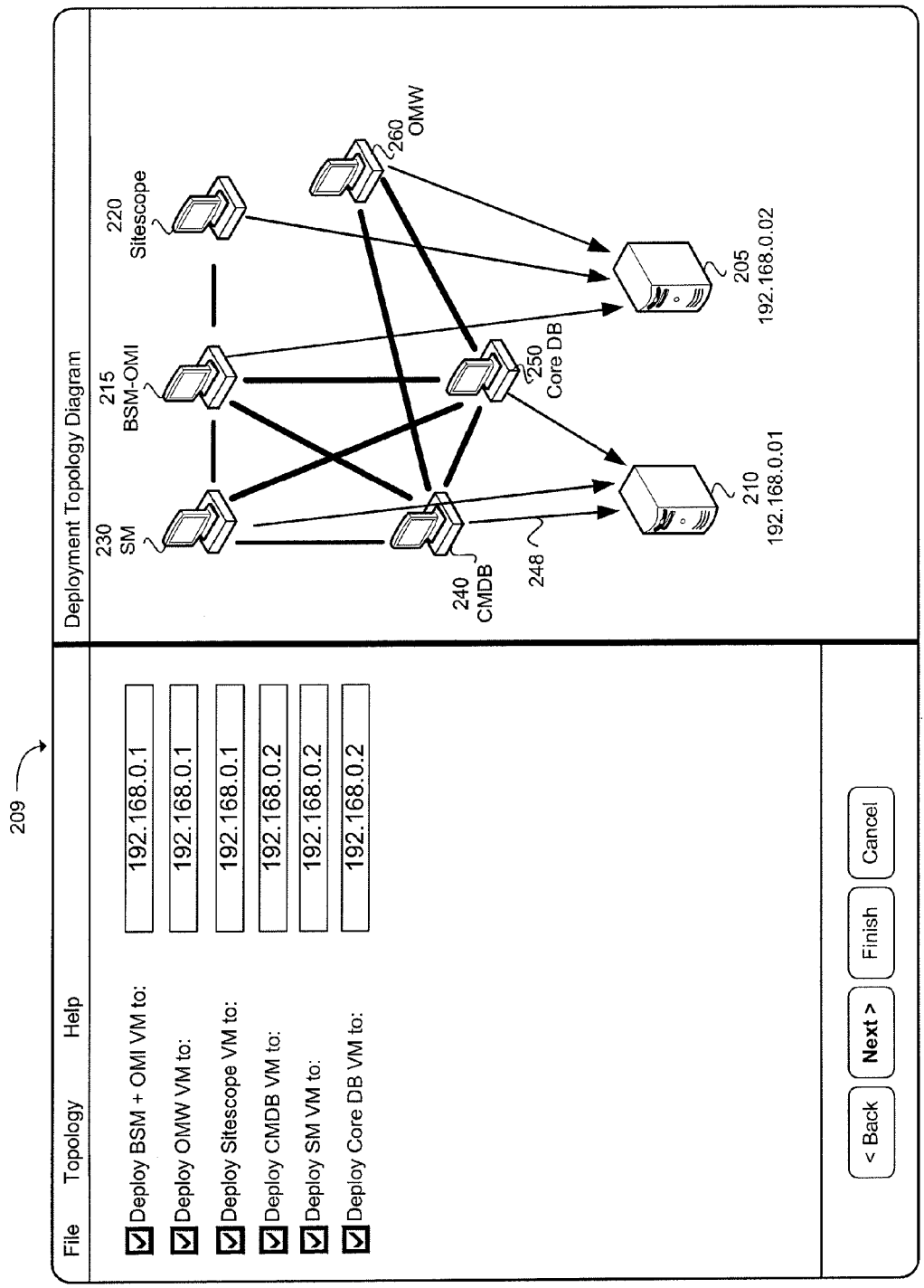
FIG. 2b is an example embodiment of a product selection screen to select which products may be deployed in the multi-component computer environment.

The machines in the example illustrated in FIG. 2b are identified by the machine's internet protocol (IP) address. The machine may also be identified by the machine's host name, or another unique property. The graphical representation provided by the product selection screen can display identifying marks such as arrowed line 248 that represents the machine 210 on which the displayed product 240 will deploy. Additional settings such as the deployment machine credentials can be specified. For example, the machine icon can be right clicked on to provide access to a list of the machine's credentials.

In one embodiment, the settings performed on a deployment machine can globally affect all of the products connected to that machine. In order to remove a product from the deployment, the user can uncheck the relevant product checkbox item. Un-checking the product checkbox can disable the product as well as all of its integrations from the deployment.

The deployment machine credentials can be used as the login credentials, such as username and password, for performing various tasks on the deployment machine. Additional properties may include:

Host—the deployment machine host name or IP address;
Username—specifies the username for the deployment machine login;
Password—specifies the user password for the deployment machine login;
Test Connection—verifies the connection to the deployment machine using the provided username and password; and
Refresh Server Details—updates the details from the deployment machine used for deploying a virtual machine or to install software softwar on a physical server. Checks are made for available memory and diskspace on the target machine. When operating on a hypervisor, the resource pools, datastores, virtual networks, and so forth are extracted. Additional details can also be provided, as desired.

The virtual appliance settings specify the details needed to deploy the virtual machine to the deployment machine. The details provided to deploy the virtual machine can include:

Resource Pool—the resource pool that manages the virtual machine resources;
Datastore—the datastore that contains the virtual machine files;
Virtual Network—used to associate with the virtual machine. In one embodiment, all virtual machines that connect to the same port group can belong to the same network inside the virtual environment even if they are on different physical servers; and
OS Activation Key—specifies the product key that is applied to the operating system of the virtual machine on its first initiation. For instance, the operating system may be Windows Server 2008 or another type of desired operating system that requires an activation key, such as Windows Desktop.

Figure 2C:
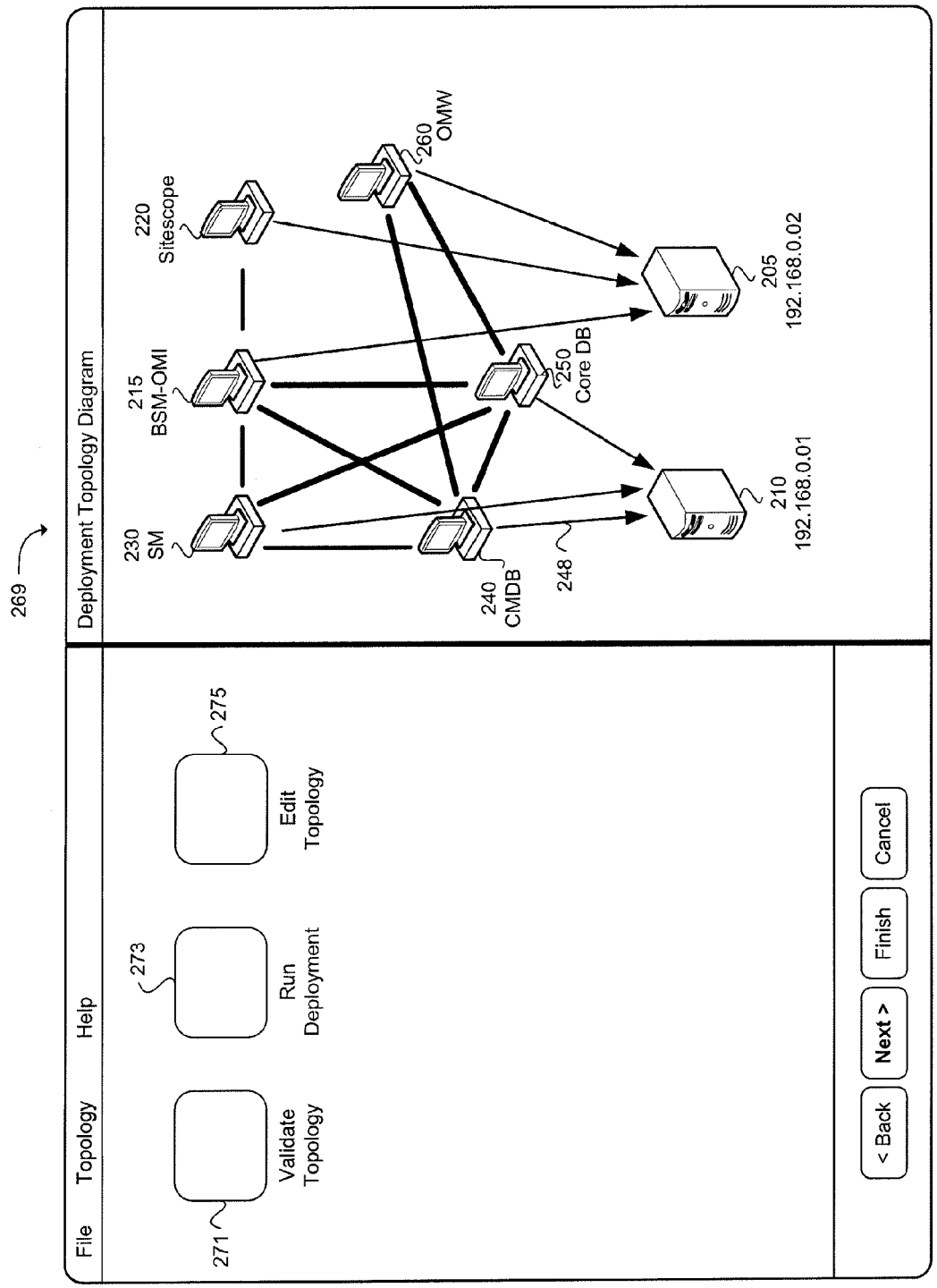
FIG. 2c is an example embodiment of a deployment execution screen for the deployment topology.

A set of validation procedures can be defined for each deployed product. The validation procedures can be executed before and/or after the product deployment in order to ensure a successful deployment procedure. For instance, FIG. 2c illustrates an example of a deployment execution page. The deployment execution page can provide the user with the ability to verify the deployment topology and execute the deployment process. The deployment execution page can display the full deployment topology 269 that the user designed in the solution selection screen 200 (FIG. 2a) and the product selection screen 209 (FIG. 2b).

The deployment execution page 269 can be configured to provide the user with the ability to validate the topology 271, execute the deployment 273 and open an advanced designer to edit the topology 275. These functions will each be discussed briefly, with a more detailed discussion of each to follow.

The user can select the validate topology 271 function to perform a validation of the deployment topology that includes confirming that all of the products are connected to a deployment machine, login credentials are accurate, the parameters are setup correctly and system limitations are not exceeded.

The user can select the run deployment 273 function to launch the deployment of the multi-component computer environment. This includes deploying, validating and starting all of the products and deploying and validating all of the integrations between the products. Process indicators can be used to display the deployment of an individual product or integration and provide a deployment phase indication as the deployment advances. Detailed information regarding the progress of the deployment and integration can also be provided.

The user can select the edit topology 275 function to open an advanced designer perspective in order to provide the user with advanced editing and management capabilities.

Topology Validations

The topology validation executes a set of actions that verify that the products in the topology conform to the limitations of the deployment environment. These validations indicate whether the user definitions for the topology conform to the known environmental limitations. The Topology Validation table illustrated in FIGS. 3a and 3b provides an example of selected validation actions that can be executed.

The user can be provided with the ability to confirm that the target deployment machines, either physical or virtual, have the system resources needed for the deployment. The full machine specifications can be extracted and compared with the requirements of the deployment topology, thereby enabling the user to create a desired deployment design. The machine specifications include the available resource pools, virtual machine folders, datastores and virtual networks that are used for deploying virtual machines. In addition, a plug-in framework can be provided for user add-ons. These add-ons enable the user to plug-in additional validation logic. The deployment validation plug-ins can be executed before and/or after each deployment step.

Execute Deployment

When executing a deployment, the user can be provided with real-time feedback that indicates the success level of the deployment. The real time feedback can include graphical and textual information showing the progress of the deployment.

One step in the deployment process can be to deploy the virtual machines onto the relevant deployment machines. Once this is complete, the next step can configure the products on the virtual machines. After the products have been configured, the integrations between the products can be completed and the solution can be finalized.

As the deployment process is performed, the process can be accompanied by a monitoring program that may be used to supervise the progress of the topology deployment and indicate the level of success.

In accordance with one embodiment, the system can utilize the deployment processing module for translating the deployment topology from the user interface module into the set of deployment actions, as previously discussed. The deployment actions can be compiled in a workflow script. The orchestration engine can use the set of deployment actions in the workflow script to execute an automated deployment of a multi-component computer environment. The deployment processing module can report the execution progress back to the user interface module in order to provide a graphic execution feedback.

The deployment processing module can be used for: deployment execution; starting and stopping execution of products in the multi-component computer environment; and the start, shutdown, restart, and deletion of virtual machines.

The orchestration engine receives the set of deployment actions in the workflow script in the form of a file, such as an XML file or other types of files or database stores. The deployment actions may also be created using other types of languages including markup languages such as hyper text markup language (HTML). The instructions can be executed in a dedicated flow. The orchestration engine executes the applicable flow either in parallel or sequentially according to the designed topology. The orchestration engine reports the execution progress to the deployment processing module in order to provide the graphic deployment feedback in the user interface module.

When errors or problems are noted in the graphic deployment feedback, or when changes are desired by the user, the deployment topology editor 275 (FIG. 2c) can be used to make changes to the pre-defined setup in the desired topology.

Deployment Topology Editor

Figure 2D:
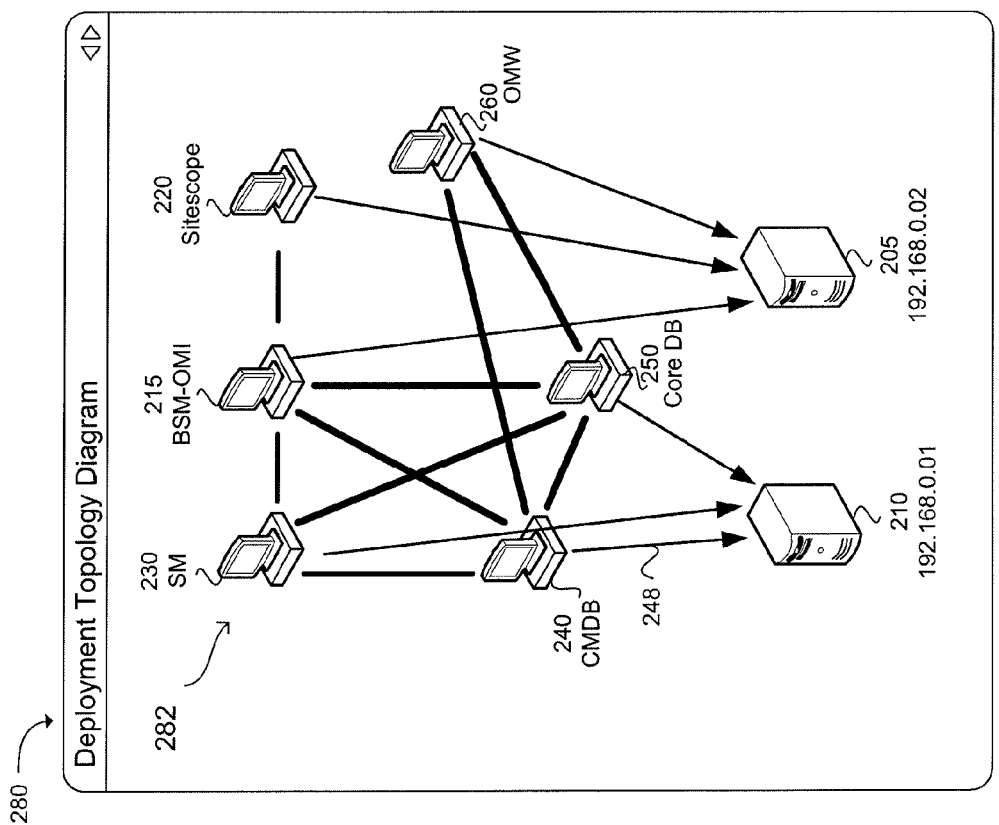
FIG. 2d is an example illustration of a topology editor used to edit a deployment topology diagram.

The deployment topology editor is the central topological graphical editor that provides the user with the ability to visually structure and edit the functionality of the topology components. FIG. 2d provides an example illustration of a topology editor 280 that is used to display a deployment topology diagram 282. The deployment topology editor enables the user to edit the deployment topology using graphic editing capabilities. The capabilities include drag and drop functionality for adding new components, moving components, creating connections between components to form integrations, deleting components, and undo and redo functionality.

In one embodiment, the user can right click on the components in the deployment topology editor to bring up right-click context menus that provide the user with a set of functions for updating properties, micro management and product editing capabilities. The set of functions provided in the right-click context menus can include:

Enable/Disable—toggles the enable/disable state of the product;

Exists/Not Exists—toggles between the "exists" state of the product;

Product—sub menu for managing the product;

Virtual Appliance—sub menu for managing the virtual appliance (if applicable);

Open Console—Opens a remote console to the virtual machine;

Undo/Redo—last edit operation; and

Delete—delete the product.

The "Product" sub-menu set of functions may include:

Open Web UI—opens a web user interface of the product in the default browser (if applicable);

Start Product—starts the product application(s) running; and Stop Product—stops the product application(s) from running.

The "Virtual Appliance" sub menu set of functions can include:

Power On VM—powers on the virtual machine;

Shut Down VM—shuts down the virtual machine;

Restart VM—restarts the virtual machine; and

Delete VM—deletes the virtual machine.

A "Deployment Machine" right-click menu provides the user with the functionality to control the deployment machine. The set of functions can include:

Update Machine Properties—opens an "Update Machine Properties" dialog in order to update the machine properties, such as available resource pools, from the actual machine;

Undo/Redo—last edit operation; and

Delete—delete the physical machine.

Property Categories

In one embodiment the deployment topology editor is configured such that the user can select an entity in the deployment topology diagram to reveal the properties of the selected entity in a properties panel. The properties may be grouped according to category and vary according to the entity type selected. Common properties have the same meaning regardless of the selected entity. Common properties include the name, identification, and description. Distinct properties are properties unique to the selected entity such as operating system, activation key, and virtual network. The property categories table, illustrated in FIG. 3c provides a list of common property categories. Additional property categories can also be defined, as can be appreciated.

Figure 4:
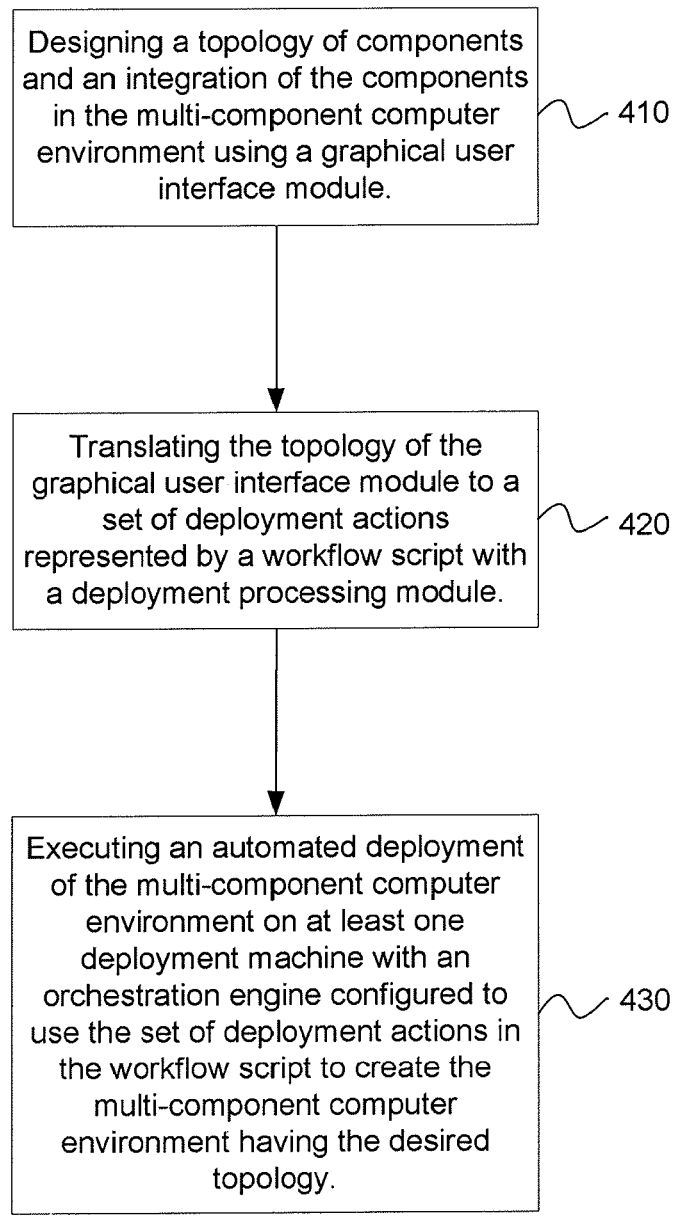
FIG. 4 is a flow chart depicting a method for automated deployment of a multi-component computer environment in accordance with an embodiment of the present invention.

In another embodiment, a method for automated deployment of a multi-component computer environment is disclosed, as depicted in the flow chart of FIG. 4. The method includes the operation of designing 410 a topology of components and an integration of the components in the multi-component computer environment using a graphical user interface module. The topology of the graphical user interface module can be translated 420 into a set of deployment actions represented by a workflow script. An automated deployment of the multi-component computer environment is executed 430 on at least one deployment machine with an orchestration engine configured to use the set of deployment actions in the workflow script to create the multi-component computer environment having the desired topology. The topology design and the automated deployment can be validated both before and after the multi-component computer environment has been deployed.

In one embodiment, the multi-component computer environment can be automatically deployed onto one or more virtual machines. Deploying the environment onto virtual machine(s) enables a proof of concept of the deployment to be assembled without the need to have all of the hardware available. Once the proof of concept for the deployment has been proven, the topology can be updated and one or more of the components in the multi-component computer environment can be relocated from the virtual machine to at least one physical machine when the multi-computer environment is installed at a customer location, as desired by the customer. The method can be used both as a proof of concept for a designed deployment and to automate the deployment of a multi-component computer environment onto a customer's physical and/or virtual machines. The ability to create a proof of concept as well as automate the deployment of a multi-component computer environment can provide significant savings of time and labor resources, thereby reducing the cost of purchasing and installing new systems and upgrades to existing multi-component computer systems.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system.

However, the program(s) may be implemented in assembly or machine language, if desired. In any case, the language may be a compiled or interpreted language, and combined with hardware implementations.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A system for automated deployment of a multi-component computer environment, the system comprising:
   at least one physical deployment machine of servers and virtual machines operable on servers;
   a graphical user interface module to enable a user to design a desired topology of components including deployed products, target physical and virtual deployment machines, and the connections between them in the multi-component computer environment;
   a deployment processing module to convert the desired topology to a set of deployment actions represented in a workflow script onto one or more virtual machines to enable a proof of concept of the desired topology; and
   an orchestration engine to use the set of deployment actions in the workflow script to execute an automated deployment of the multi-component computer environment and relocate the desired topology on the at least one physical deployment machine to create the multi-component computer environment having the desired topology.

2. The system of claim 1, further comprising a solution deployment repository containing entity definitions, runtime executables, and the set of deployment actions used in the automated deployment of the multi-component computer environment.

3. The system of claim 2, wherein the solution deployment repository contains at least one runtime executable to be deployed by the orchestration engine as a virtual appliance.

4. The system of claim 2, wherein the orchestration engine:
   performs a set of pre-deployment validations of component specifications;
   deploys the components and virtual appliances;
   integrates the components and virtual appliances; and
   validates the integration of the components and virtual appliances in the multi-component computer system.

5. The system of claim 1, wherein the workflow script is included in a deployment extensible markup language (XML) file.

6. The system of claim 1, wherein the orchestration engine provides feedback to the deployment processing module to provide a graphical update of progress of the automated deployment of the multi-component computer environment in the graphical user interface module.

7. The system of claim 1, wherein the orchestration engine uses the set of deployment actions in the workflow script to execute an automated deployment of the multi-component computer environment onto a plurality of virtual machines and physical machines.

8. A method for automated deployment of a multi-component computer environment, comprising:
   providing at least one physical deployment machine of servers and virtual machines operable on servers;
   designing, via a processor, a desired topology of components including deployed products, target physical and virtual deployment machines, and the connections between them and an integration of the components in the multi-component computer environment using a graphical user interface module;
   translating, via a processor, the desired topology of the graphical user interface module to a set of deployment actions represented by a workflow script onto one or more virtual machines to enable a proof of concept of the desired topology; and
   executing, via a processor, an automated deployment of the multi-component computer environment and relocate the desired topology on the at least one physical deployment machine with an orchestration engine configured to use the set of deployment actions in the workflow script to create the multi-component computer environment having the desired topology.

9. The method of claim 8, further comprising providing feedback of the automated deployment from the orchestration engine to a deployment processing module to provide a graphical update of progress of the automated deployment of the multi-component computer environment in the graphical user interface module.

10. The method of claim 8, executing an automated deployment further comprises executing an automated deployment of the multi-component computer environment on at least one virtual machine operating on the deployment machine.

11. The method of claim 8, further comprising updating the topology and the integration to execute the automated deployment of the multi-component computer environment onto at least one physical machine at a customer installation location.

12. The method of claim 8, further comprising validating the design of the topology and the integration.

13. The method of claim 8, further comprising validating the automated deployment of the multi-component computer environment on the at least one physical deployment machine.

14. A system for automated deployment of a multi-component computer environment, the system comprising:
   at least one physical deployment machine of servers and virtual machines operable on servers;
   a graphical user interface module to enable a user to design a desired topology of components including deployed products, target physical and virtual deployment machines, and the connections between them in the multi-component computer environment;

a deployment processing module to convert the desired topology to a set of deployment actions represented in a workflow script onto one or more virtual machines to enable a proof of concept of the desired topology; and an orchestration engine to use the set of deployment actions in the workflow script to execute an automated deployment of the multi-component computer environment on the at least one physical deployment machine, wherein the orchestration engine further:

performs a set of pre-deployment validations of component specifications;

deploys the-components and virtual appliances;

integrates the components and virtual appliances; and validates the integration of the components and virtual appliances in the multi-component computer system.

15. A non-transitory, computer-readable memory comprising a computer readable program code embodied therein, said computer readable program code adapted to be executed to implement a method for automated deployment of a multi-component computer environment, comprising:

designing a desired topology of components and an integration of the components including deployed products, target physical and virtual deployment machines, and the connections between them in the multi-component computer environment using a graphical user interface module;

translating the desired topology of the graphical user interface module to a set of deployment actions represented by a workflow script onto one or more virtual machines to enable a proof of concept of the desired topology; and executing an automated deployment of the multi-component computer environment on at least one physical deployment machine of servers and virtual machines operable on servers with an orchestration engine to use the set of deployment actions in the workflow script to create the multi-component computer environment having the desired topology.

16. The system of claim 14, wherein the deployment processing module is in communication with a solution deployment repository used to design deployment topologies, execute a deployment process, and to manage a deployed environment.

17. The system of claim 14, wherein the deployment processing module reports the execution progress of the automated deployment of the multi-component computer environment back to the graphical user interface module in order to provide graphic execution feedback.

18. The system of claim 14, wherein the orchestration engine uses the set of deployment actions in the workflow script to execute an automated deployment of the multi-component computer environment onto a plurality of virtual machines and physical machines.

19. The non-transitory, computer-readable memory comprising the computer readable program code of claim 15, comprising providing feedback of the automated deployment from the orchestration engine to a deployment processing module to provide a graphical update of progress of the automated deployment of the multi-component computer environment in the graphical user interface module.

20. The non-transitory, computer-readable memory comprising the computer readable program code of claim 15, comprising designing the desired topology and the integration to execute the automated deployment of the multi-component computer environment onto at least one virtual machine for a proof of concept of the desired topology.

21. The non-transitory, computer-readable memory comprising the computer readable program code of claim 15, comprising updating the desired topology and the integration to execute the automated deployment of the multi-component computer environment onto at least one physical machine at a customer installation location.

22. The non-transitory, computer-readable memory comprising the computer readable program code of claim 15, comprising validating the automated deployment of the multi-component computer environment on the at least one deployment machine.

\* \* \* \* \*